Dec. 14, 1948.　　　　　O. G. RIESKE　　　　　2,456,446
COCONUT PEELING MACHINE HAVING ROTARY RADIAL
CUTTER BLADES WITH FAN PORTIONS
Filed July 27, 1944　　　　　　　　　　　　　2 Sheets-Sheet 1
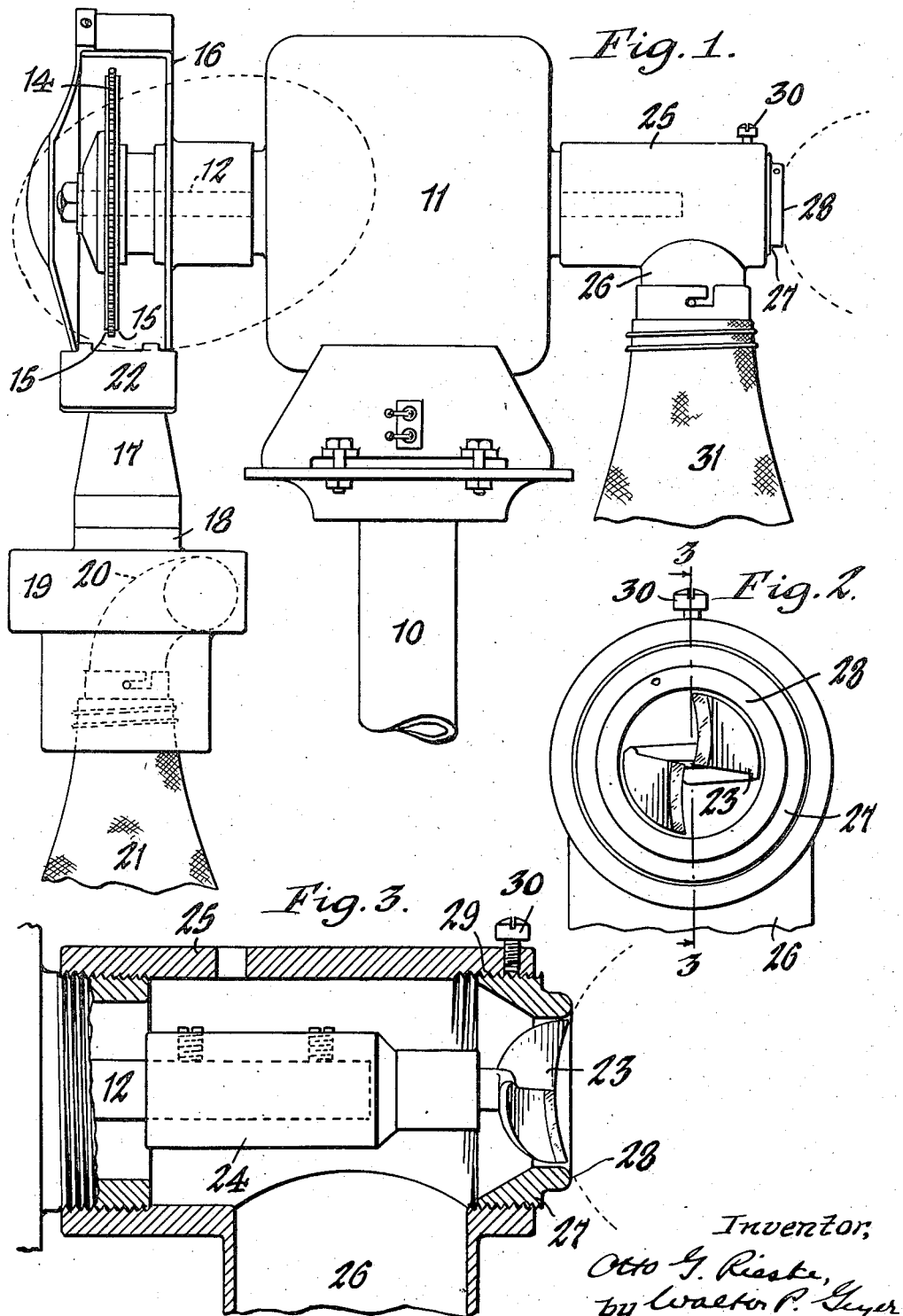

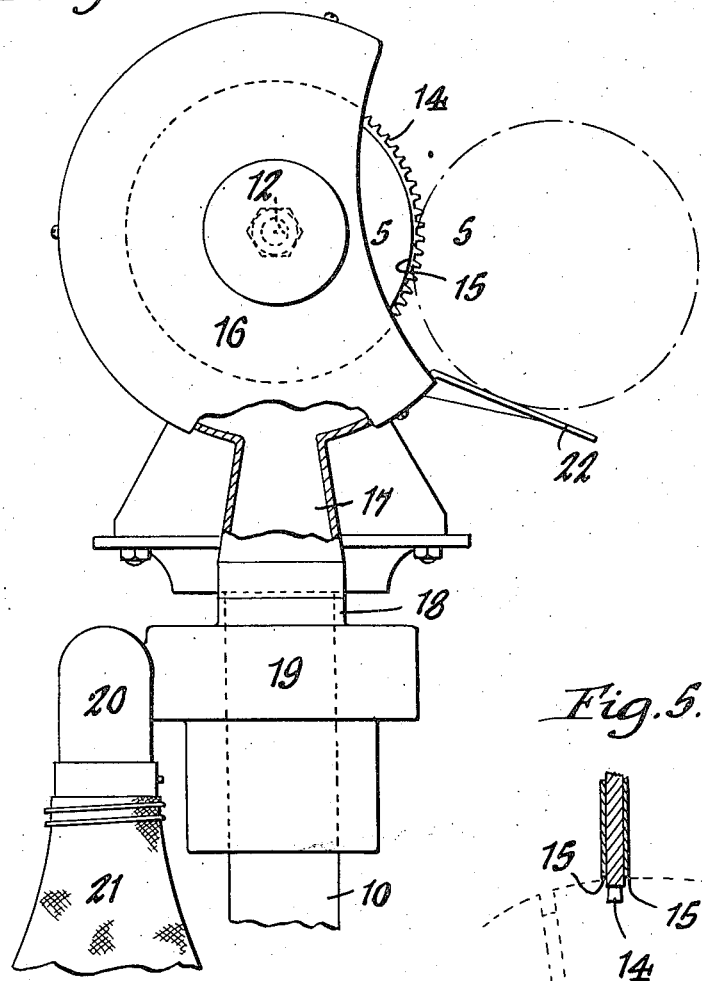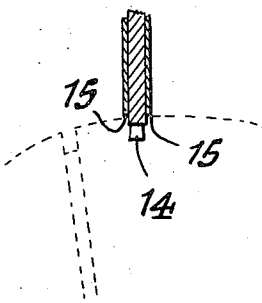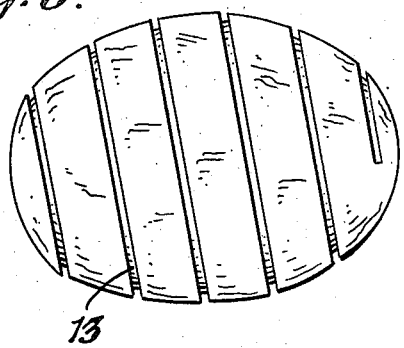

Patented Dec. 14, 1948

2,456,446

UNITED STATES PATENT OFFICE 2,456,446

COCONUT PEELING MACHINE HAVING ROTARY RADIAL CUTTER BLADES WITH FAN PORTIONS

Otto G. Rieske, Buffalo, N. Y.

Application July 27, 1944, Serial No. 546,867

1 Claim. (Cl. 146—7)

This invention relates generally to the treatment of coconuts but more particularly to an apparatus or machine for peeling them.

It has for one of its objects to provide a simple and efficient machine of this character which is so designed and constructed as to operate on the coconut to facilitate the removal of its shell in a clean-cut and facile manner without injury to the nut-meat and to effect the removal of the skin therefrom with a minimum of waste.

Another object of the invention is to provide a coconut peeling machine having duplex cutter mechanisms thereon, one for producing a saw-like cut about the shell from end to end thereof and at a predetermined depth, and the other for paring or shaving the skin from the nut to any desired thickness.

A further object is to provide a machine for removing the shell and skin from coconuts, which is compact, inexpensive and durable in construction, which is convenient and simple to use, and which provides means for disposing of the shell-dust and skin-fragments during the peeling operations.

Other features of the invention reside in the construction and arrangement of parts hereinafter described and particularly pointed out in the appended claim.

In the accompanying drawings:

Figure 1 is a fragmentary front view of the coconut peeling machine embodying my invention. Figure 2 is an enlarged front end view of the skin-peeling mechanism thereof. Figure 3 is a longitudinal section taken in the plane of line 3—3, Figure 2. Figure 4 is an end view, partly in section, of the shell-cutting mechanism. Figure 5 is an enlarged cross-section taken on line 5—5, Figure 4. Figure 6 is a side view of a coconut showing the spiral saw-cut formed in the shell by the machine preparatory to its removal.

Similar characters of reference indicate corresponding parts throughout the several views.

My improved machine consists of a central or upright standard 10 having an electric motor 11 mounted thereon including a shaft 12 projecting from opposite sides thereof for operating cutter mechanisms. One of the cutter mechanisms is designed to produce a saw-like cut about the shell from end to end thereof, as indicated at 13 in Figure 6, while the other cutter mechanism is adapted to pare or shave the inner skin from the coconut.

The cutter mechanism for producing the saw-like cut in the shell to facilitate its ready and clean-cut removal from the coconut consists of an annular toothed or saw-like cutter 14 fixedly mounted on the left hand end of the motor-shaft 12, viewing Figure 1. At its opposite sides this cutter has outwardly-facing annular or peripheral shoulders 15 which are disposed substantially at the base of the cutter-teeth for gaging the depth of the cut to be made in the shell. When the coconut is brought into operative engagement with the cutter 14 by the operator, these annular shoulders limit the depth of the cut and thereby prevent the cutter from entering the nut-meat. Partially enclosing this cutter is a housing or guard 16 which is open at its front side to expose a sufficient portion of the cutter for operation on the coconut, its lower end terminating in a depending hollow neck or conduit 17 which communicates with the intake 18 of an exhaust fan 19 operated by an electric motor (not shown). The outlet side 20 of this exhaust fan has a receptacle or bag 21 detachably connected thereto, so that during the operation of the machine the shell-dust is exhausted through the housing and fan into this receptacle. Projecting forwardly from the housing 16 is a support or platform 22 upon which the coconut is supported while making the spiral cut therein.

Mounted on the other or right hand end of the motor shaft 12, viewing Figures 1 and 3, is an axially-disposed or radially-bladed cutter 23 whose cutting edges are disposed in substantially alined relation radially of the cutter-axis to pare or shave the inner skin from the coconut. This axial cutter has its shank 24 removably connected to the motor-shaft in the manner shown in Figure 3 and enclosing the same and the cutter is a cylindrical or sleeve-like housing 25 having a neck 26 projecting from the lower side thereof. Mounted on this housing in operative concentric relation with the axial cutter 23 is a ring-like member 27 for gaging the thickness of skin to be peeled. This thickness-gaging member is adjustable axially relatively to the cutter and has a rounded seat 28 at its outer edge against which the coconut to be peeled is adapted to be placed. For adjustment purposes, I preferably employ a threaded connection 29 between the housing 25 and the gaging member 28 so that by shifting the latter inwardly or outwardly relative to the edges of the cutter 23 the depth of the cut may be varied accordingly, to the end that there is as little waste as possible during the peeling operation.

As shown in Figure 3, the operating edges of the cutters 23 are concavely curved to conform substantially to the curved surface of the coconut. A set screw 30 is employed for retaining the gaging member 28 in its set position of adjustment. It will be noted in Figures 2 and 3 that I employ two cutter blades on the axial cutter 23 and that such blades deflect rearwardly and outwardly from their cutting edges and serve as fan blades to direct the peelings into the neck 26 of the housing 25.

Detachably connected to the housing-neck is a bag or receptacle 31 into which the peelings are directed. The provision of this bag and the shell-dust bag 21 afford a ready and convenient means of receiving the shell and peeling fragments and makes for sanitation in the operation of the machine.

After preparing the spiral saw cut 13 in the coconut from end to end thereof, the divided shell is then removed by inserting a flexible knife between the shell and the skin of the coconut and by working the knife around the coconut from end to end thereof, effectually removing the shell. In this connection, a longitudinal saw may be made in the shell to more readily facilitate the removal of the spirally-cut shell from the coconut. Upon removal of the shell in this manner, the coconut is then brought into operative relation with the axial cutter 23 and the skin peeled therefrom by a turning or rotating action of the coconut.

I claim as my invention:

A machine for peeling coconuts, comprising a standard, a power unit including a shaft having an axially-disposed, outwardly-facing, blade-like cutter on the outer end of said shaft, a housing about said shaft and cutter having a peeling-discharge opening in its bottom and an axial opening in its outer end containing an annular seat in correlation to said cutter and against which the coconut is engaged for peeling, the cutter blades having their cutter edges concavely curved and thence deflected rearwardly into the housing to serve as fan blades, and a receptacle detachably mounted on the housing in communicating relation with the discharge opening.

OTTO G. RIESKE.

REFERENCES CITED

The following references are of record in the file of this patent:

UNITED STATES PATENTS

| Number | Name | Date |
|---|---|---|
| 411,598 | Lewis | Sept. 24, 1889 |
| 1,166,867 | Takamine | Jan. 4, 1916 |
| 1,374,899 | Baker | Apr. 19, 1921 |
| 1,414,657 | Mertz | May 2, 1922 |
| 1,503,390 | Tenney | July 29, 1924 |
| 1,511,947 | Coder | Oct. 14, 1924 |
| 1,600,123 | Milici et al. | Sept. 14, 1926 |
| 1,626,361 | Schmitt | Apr. 26, 1927 |
| 1,720,468 | Combest | July 9, 1929 |
| 1,727,967 | Eberts et al. | Sept. 10, 1929 |
| 1,860,746 | MacDougall | May 31, 1932 |
| 1,987,611 | Ewald | Jan. 15, 1935 |
| 2,123,187 | Ewald | July 12, 1938 |
| 2,156,421 | Austria | May 2, 1939 |
| 2,208,335 | Kurtz | July 16, 1940 |
| 2,208,787 | Brown | July 23, 1940 |
| 2,255,048 | Ewald | Sept. 9, 1941 |

FOREIGN PATENTS

| Number | Country | Date |
|---|---|---|
| 27,180 | Great Britain | Dec. 11, 1903 |